United States Patent Office 3,410,887
Patented Nov. 12, 1968

3,410,887
PROCESS FOR PREPARING ALIPHATIC
ISOCYANATES
Adnan A. R. Sayigh, North Haven, and Henri Ulrich,
Northford, Conn., assignors to The Upjohn Company,
Kalamazoo, Mich., a corporation of Delaware
No Drawing. Filed Jan. 29, 1965, Ser. No. 429,144
10 Claims. (Cl. 260—453)

ABSTRACT OF THE DISCLOSURE

Aliphatic isocyanates, e.g. alkoxyalkyl and alkylthioalkyl isocyanates, which are difficult to prepare by direct phosgenation of the corresponding amines, are obtained readily in good yield by reacting the appropriate aliphatic amine with a hydrocarbylsulfonylisocyanate and phosgenating the resulting sulfonylurea to obtain the desired aliphatic isocyanate and the hydrocarbylsulfonylisocyanate starting reactant. The aliphatic isocyanates so obtained are known compounds useful as catalysts in the preparation of sulfonylisocyanates and, in the case of the aliphatic polyisocyanates, as intermediates in the synthesis of polyurethanes.

---

This invention relates to a novel process for the preparation of isocyanates and is more particularly concerned with an improved process for the preparation of aliphatic mono and polyisocyanates and with certain novel isocyanates so produced.

Isocyanates are most commonly prepared by reaction of phosgene with the corresponding primary amine, either in the form of the free base or in the form of an acid addition salt such as the hydrochloride. A typical such procedure, illustrative of those known in the art, is that described by Siefken, Annalen, 562, 85, 1948.

However, in the case of certain aliphatic isocyanates, the results obtained by direct phosgenation of the corresponding amines are far from satisfactory. For example, as noted by Siefken, supra, the phosgenation of alkoxyalkylamines gives low yields, and in certain instances, no yields, of the corresponding alkoxyalkyl isocyanates due principally to cleavage of the starting alkoxylalkylamine at the ether linkage. Similarly the direct phosgenation of alkylenediamines gives low yields of the corresponding diisocyanates. The reaction is generally slow and side reactions, such as polymerization of the isocyanate and the formation of chloroalkyl isocyanates are difficult to control.

We have now found that aliphatic isocyanates, both mono and polyisocyanates can be prepared by a novel process which gives uniformly high yields of the desired isocyanates and which is applicable to the conversion of a wide range of aliphatic amines to the correspondng isocyanates.

In its broadest aspect the present invention comprises a process for converting an aliphatic primary amine to the corresponding aliphatic isocyanate which process comprises the steps of reacting said aliphatic amine with a hydrocarbylsulfonylisocyanate to form the corresponding N-aliphatic-N'-hydrocarbylsulfonylurea and reacting the latter with phosgene.

The above process can be represented schematically as follows:

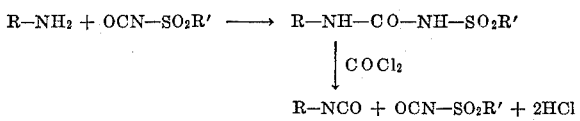

wherein RNH$_2$ represents an aliphatic primary amine as defined hereinafter and R' is a hydrocarbyl radical as defined hereinafter. The above equation shows the reaction of a mono-amine for purposes of simple illustration but, as will be discussed below, the reaction can be applied equally to diamines and higher polyamines wherein the reaction shown above will be duplicated for each amino group present.

In carrying out the process of the invention the primary amine and the hydrocarbylsulfonylisocyanate are reacted under conditions known in the art for the preparation of sulfonylureas; see, for example, U.S. Patent 2,962,530. Illustratively, the sulfonylisocyanate and the primary amine are brought together in the presence of an inert organic solvent, i.e. a solvent which does not take part in, or in any way interfere with, the reaction between the amine and the sulfonylisocyanate.

Illustrative of such solvents are benzene, toluene, xylene, ethylbenzene, cumene, mesitylene, chlorobenzene, dichlorobenzene, tetrachloroethane, hexachloroethane, and the like.

Advantageously, the reaction is conducted initially at room temperature i.e. at about 25° C. but higher temperatures can be employed if desired. The reaction is normally exothermic and it is preferable, though not essential, to add the sulfonylisocyanate to the primary amine so that the rate of heat generation can be readily controlled by adjustment of the rate of addition or by external cooling, if desired, or by a combination of these methods. The temperature during the reaction can be allowed to rise to 60°–70° C. or even higher.

Advantageously the sulfonyl isocyanate and the primary amine are employed in stoichiometric proportion, i.e., in such proportion that there is one isocyanate group for each amino group in the primary amine, but other proportions can be employed if desired, the proportions actually chosen being governed by economic considerations having due regard to the necessity of removing excess of either reactant from the resulting sulfonylurea.

The sulfonylurea so produced can be isolated from the reaction product, if desired, by conventional procedures, for example, by evaporation of the solvent and purification of the residue, if desired, by recrystallization or like methods in the case of solids, or by distillation or like methods in the case of liquids. In a preferred embodiment of the invention, however, the intermediate sulfonylurea is not isolated but the total reaction product obtained in the preparation of the sulfonyl urea is subjected, without further treatment, to the action of phosgene in the second stage of the process of the invention. The reaction of the sulfonylurea and the phosgene is carried out advantageously at a temperature within the range of about 80° to 180° C., although lower temperatures i.e. of the order of 25° C., can be employed if desired. The reaction is accomplished most conveniently by passing the phosgene into the stirred reaction product from the sulfonylurea reaction. The progress of the reaction, i.e. the conversion of sulfonylurea to the mixture of the desired aliphatic isocyanate and the hydrocarbylsulfonylisocyanate is followed by suitable means, for example, by observing the disappearance of the characteristic NH absorption bands in the infrared spectrum.

When the reaction is complete the desired aliphatic isocyanate is isolated from the reaction product by conventional procedures, for example, by fractional distillation of the reaction mixture, in the case of liquid isocyanates, or, in the case of solid isocyanates, by fractional crystallization or chromatography of the residue left after removal of the inert organic solvent from the reaction mixture. The separation of the desired aliphatic isocyanate from the reaction product is facilitated by choosing an initial reactant a hydrocarbylsulfonyl isocyanate which has a boiling point (in the case of liquids) or a melting point (in the case of solids) which differs substantially, i.e. of the order of 50 to 100° C. from that of the desired aliphatic isocyanate.

It will be seen from the above that the hydrocarbylsulfonyl isocyanate employed as a reactant in the process of the invention is regenerated in the second stage of the process and can be recovered and re-used as required.

As previously stated, the process of the invention is of general applicability and can be used in the conversion of any mono or poly primary aliphatic amine to the corresponding mono or polyisocyanate. The term "aliphatic amine" means an amine in which the amino group is (or in the case of polyamines, the amino groups are) attached to carbon atoms or atoms which forms part of an essentially open chain hydrocarbon moiety.

Examples of essentially open chain hydrocarbon moieties which form the hydrocarbon residue of the primary amines employed in the process of the invention are monovalent moieties such as alkyl, for example, methyl, ethyl, isopropyl, t-butyl, octyl, dodecyl, octadecyl and the like; alkenyl, for example, propenyl, butenyl, isopentenyl, hexenyl, nonenyl, octadecenyl, and the like; alkynyl, for example, propynyl, butynyl, hexynyl, dodecylnyl, tetradecynyl, and the like; divalent moieties such as alkylene, for example, methylene, ethylene, propylene, butylene, 3 - hexylene, 2 - octylene, decylene, dodecylene and the like; oxaalkylene such as 2 - oxa - 1,3 - propylene, 2 - oxa - 1,4 - butylene, 3 - oxa - 1,5 - pentylene, 3,5 - dioxa - 1,8-octylene, and the like; thiaalkylene such as 2 - thia - 1,3-propylene, 2 - thia - 1,4 - butylene, 3 - thia - 1,5 - pentylene, 3,5 - dithia - 1,8 - octylene and the like; alkylene interrupted by arylene, for example,

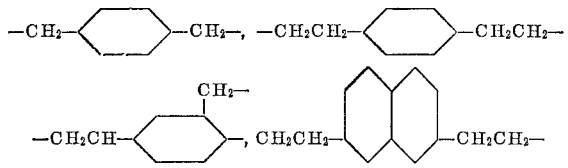

and the like; and trivalent moieties such as alkanetriyl, for example, 1,2,3—propanetriyl (—CH₂—ĊH—CH₂—)

1,2,4—butanetriyl (—CH₂—ĊH—CH₂—CH₂—)

1,3,4—hexanetriyl (—CH₂—CH₂—ĊH—ĊH—CH₂—CH₃)

1,3,8—octanetriyl (—CH₂—CH₂—ĊH—CH₂—CH₂—CH₂—CH₂CH₂—)

and the like.

The open chain hydrocarbon moiety can be substituted by one or more radicals which are inert under the conditions of the reaction i.e. which do not react with the hydrocarbylsulfonyl isocyanate employed in the first stage of the reaction or with the phosgene employed in the second stage of the reaction. Examples of such substituents are alkyl, for example, methyl, ethyl, isopropyl, hexyl, octyl, and the like; alkoxy, for example, methoxy, ethoxy, propoxy, pentyloxy, octyloxy, and the like; alkylthio for example, methylthio, ethylthio, propylthio, hexylthio, octylthio, and the like; halo, i.e. fluoro, chloro, bromo, and iodo; tertiary amino such as dimethylamino, diethylamino, dipentylamino, methylethylamino, pyrrolidino, 2,2-dimethylpyrrolidino, piperidino, N - methylpiperazino, N-ethylpiperazino, morpholino, hexamethyleneimino, and the like; alkoxycarbonyl such as methoxycarbonyl, propoxycarbonyl, hexyloxycarbonyl, octyloxycarbonyl, and the like; nitro; cyano; and the like.

In summary, the aliphatic primary amines which are employed as starting materials in the process of the invention and are thereby converted to the corresponding isocyanates, can be represented for the most part by the following general formula:

$$A(NH_2)_y$$

wherein A is an aliphatic moiety, i.e. an essentially open chain hydrocarbon moiety, as hereinbefore defined and exemplified and $y$ is an integer equal to the valency of the moiety A.

The hydrocarbylsulfonyl isocyanates which are employed as starting materials are the compounds represented by the formula $R'SO_2NCO$ in the equation shown above wherein $R'$ is a hydrocarbyl radical. The term hydrocarbyl means the monovalent radical obtained by removing one hydrogen atom from the parent hydrocarbon. Preferably, but not necessarily, the parent hydrocarbon contains from 1 to 18 carbon atoms, inclusive. Illustrative of hydrocarbyl radicals are alkyl groups such as methyl, ethyl, propyl, butyl, pentyl, hexyl, octyl, decyl, dodecyl, hexadecyl, octadecyl, and the like, including isomeric forms thereof; alkenyl groups such as allyl, butenyl, pentenyl, hexenyl, octenyl, and the like including isomeric forms thereof; aralkyl such as benzyl, phenethyl, phenylpropyl, benzhydryl, naphthylmethyl, and the like; aryl such as phenyl, tolyl, xylyl, naphthyl, biphenyl, and the like, cycloalkyl such as cyclobutyl, cyclopentyl, cyclohexyl, cycloheptyl, cyclooctyl and the like, including isomeric forms thereof; cycloalkenyl such as cyclopentenyl, cyclohexenyl, cycloheptenyl, and the like including isomeric forms thereof. The hydrocarbyl moiety $R'$ of the sulfonylisocyanates $R'SO_2NCO$ can, if desired, be substituted by one or more groups which are inert under the conditions of the reaction; such substituents are defined and exemplified above. Illustrative of such substituted hydrocarbyl groups are chloromethyl,
trichloromethyl,
trifluoromethyl,
2-chloroethyl,
2,3-dichlorobutyl,
5-bromooctyl,
6,7-dibromodecyl,
methoxymethyl,
2-ethoxypropyl,
3-ethoxyhexyl,
2-cyanoethyl,
3-cyanopropyl,
2-methylmercaptopropyl,
4-chlorophenyl,
3-fluorophenyl,
4-cyanophenyl,
3-methoxyphenyl,
4-ethoxyphenyl,
2-chloronaphthyl,
2-methylmercaptophenyl,
3,4-dimethoxyphenyl,
3-chlorobenzyl,
4-fluorobenzyl,
2-methoxycyclopentyl,
3-bromocyclohexyl,
4-chlorovinyl,
nitromethyl,
3-nitrobutyl,
4-nitrophenyl,
2-nitronaphthyl,
3-methyl-4-nitrophenyl,
3-nitrocyclopentyl,
2-nitro-1-butenyl,
4-methylmercaptobenzyl,
2-chlorobenzhydryl,
2,4-dibromobenzhydryl, and the like.

The sulfonylisocyanates $R'SO_2NCO$ are for the most part known in the art or can be made by procedure known in the art. Illustratively the sulfonylisocyanates can be prepared by reacting the corresponding sulfonamides with phosgene in the presence of an inert organic solvent, as hereinbefore defined, using the procedure described by King, J. Org. Chem. 25, 352, 1960. An increased yield is obtained in this reaction by carrying out the phosgenation in the presence of an organic isocyanate preferably a hydrocarbyl isocyanate wherein hydrocarbyl is as hereinbefore defined.

The sulfonyl isocyanates R'SO₂NCO employed in the process of the invention can also be prepared in a convenient manner by reacting the corresponding sulfonamide R'SO₂NH₂ with an isocyanate, preferably a loweralkyl isocyanate such as butyl isocyanate, to form the corresponding sulfonylurea and reacting the latter with phosgene at a temperature within the range of 0° C. to about 175° C. to yield a mixture of the desired sulfonylisocyanate and the regenerated lower-alkyl or other isocyanate employed as starting material. The mixture of the two isocyanates is separated by conventional procedures such as fractional distillation in the case of liquids or fractional crystallization, chromatography, and the like in the case of solids.

While any hydrocarbylsulfonylisocyanate can be employed in the process of the invention as described above it is convenient to choose one which has physical properties such that it can be easily separated from the desired aliphatic isocyanate produced according to the invention.

As set forth above, the process of the invention is of general applicability and can be used to prepare any aliphatic mono- or polyisocyanate. It is particularly valuable in the preparation of aliphatic mono- and polyisocyanates which have hitherto been difficult to prepare from the corresponding mono- and poly- primary aliphatic amines. Illustrative of the mono- and poly- primary aliphatic amines which hitherto have proven difficult to convert to the corresponding isocyanates are:

(a) Alkoxyalkylamines, particularly those containing a total of from 2 to 18 carbon atoms, inclusive, such as methoxymethylamine,
2-ethoxypropylamine,
3-ethoxypropylamine,
4-methoxybutylamine,
2-methoxybutylamine,
6-ethoxyhexylamine,
2-ethoxydecylamine,
5-butoxydodecylamine and the like;

(b) Alkylthioalkylamines, particularly those containing a total of from 2 to 18 carbon atoms, inclusive, such as methylthiomethylamine,
2-ethylthioethylamine,
2-ethylthiobutylamine,
3-methylthiobutylamine,
3-ethylthiohexylamine,
2-ethylthiodecylamine,
6-ethylthiododecylamine and the like;

(c) Alkylene diamines NH₂—(C$_n$H$_{2n}$)—NH₂ wherein C$_n$H$_{2n}$ represents alkylene containing from 1 to 10 carbon atoms, inclusive, such as ethylene,
1,3-propylene,
propylidene,
isopropylidene,
1,2-butylene,
1,4-butylene,
2-ethyl-1,3-butylene,
hexamethylene,
2,4-hexylene,
1,3-octylene,
octamethylene,
decamethylene and the like;

(d) Oxaalkylenediamines

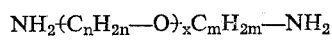

wherein C$_n$H$_{2n}$ and C$_m$H$_{2m}$ each represent alkylene containing from 1 to 10 carbon atoms, inclusive, as hereinbefore defined, and $x$ is an integer from 1 to 3, such as 2-oxa-1,3-propylenediamine,
3-oxa-pentamethylenediamine,
4-oxa-heptamethylenediamine,
3,5-dioxaheptamethylenediamine,
5-oxanonamethylenediamine,
4,7-dioxadecamethylenediamine,
4,9-dioxadodecamethylenediamine,
5-methyl-4,
6-dioxanonamethylenediamine,
5,6-dimethyl-4,
7-dioxadecamethylenediamine,
4,7,10-trioxatridecamethylenediamine and the like; and (e) Thiaalkylenediamines

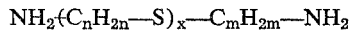

wherein C$_n$H$_{2n}$, C$_m$H$_{2m}$ and $x$ have the significance hereinbefore defined, such as 2-thia-1,
3-propylenediamine,
3-thiapentamethylenediamine,
3,7-dithianonamethylenediamine,
4,7-dithiadecamethylenediamine,
4,8-dithiaundecamethylenediamine,
3,6-dithianonamethylene diamine,
3,7-dithiadecamethylenediamine,
5-thiaundecamethylenediamine and the like.

The above aliphatic mono- and polyamines can be prepared by methods well-known in the art. For example, the alkoxyalkylamines (a) and the alkylthioalkylamines (b) can be prepared by alkylation of the corresponding hydroxyalkylnitriles or mercaptoalkylnitriles followed by catalytic hydrogenation of the alkoxyalkyl nitriles or alkylthioalkyl nitriles so obtained. The alkylation can be carried out conveniently by reacting the appropriate alkyl halide with the appropriate hydroxy- or mercaptoalkylnitrile in the presence of a base such as an alkali metal alkoxide, for example, sodium methoxide, sodium ethoxide, potassium butoxide, and the like. The reduction of the intermediate alkoxyalkyl nitrile or alkylthioalkyl nitrile can be accomplished using catalytic hydrogenation procedures such as Raney nickel, hydrogen and platinum oxide, and the like.

Similarly the oxaalkylenediamines (d) and thiaalkylenediamines (e) can be prepared by procedures known in the art; see, for example, Chemical Abstracts 48, 8728, 1954; U.S. Patent 2,409,675; U.S. Patent 2,428,108; J. Am. Chem. Soc. 74, 4188, 1952. Illustratively the compounds of groups (d) and (e) can be prepared by cyanoalkylation of the appropriate hydroxyalkylamine, alkylenediol, mercaptoalkylamine, or alkylenedithiol followed by reduction of the intermediate nitrile using the alkylation and reduction procedures described above.

The mono and polyisocyanates produced by the process of the invention are useful as intermediates in chemical synthesis. For example, the aliphatic monoisocyanates are useful in the conversion of hydrocarbylsulfonamides to the corresponding hydrocarbylsulfonyl isocyanates; illustratively the aliphatic monoisocyanate is reacted with the appropriate hydrocarbylsulfonamide under conditions known in the art for the preparation of sulfonyl ureas (see, for example, Petersen, Berichte, 83, 551, 1950), to form the corresponding hydrocarbylsulfonylurea and the latter is then reacted with phosgene to give a mixture of the appropriate hydrocarbylsulfonyl isocyanate and the original aliphatic isocyanate. The hydrocarbylsulfonyl isocyanates so obtained are useful as stabilizers. For example, they can be used to stabilize organic isocyanates against discoloration and decomposition on storage.

The aliphatic polyisocyanates produced in accordance with the process of the invention are useful in the synthesis, by reaction with suitable polyols, of polyurethanes using procedures well-known in the art; see, for example, Saunders et al. "Polyurethanes," Part I, Interscience Publishers, New York (1962).

The following examples illustrate the best mode contemplated by the inventors for carrying out their invention but are not to be construed as limiting the scope thereof.

Example 1—Hexamethylene diisocyanate

A total of 95.6 g. (0.4 mole) of p-sec. butylbenzenesulfonyl isocyanate was added, dropwise with stirring, over a period of 18 minutes to a solution of 23.2 g. (0.2 mole) of hexamethylene diamine in 1 liter of o-dichlorobenzene. During the addition the temperature rose from an initial value of 21° C. to a maximum of 44° C. The resulting suspension of N,N'-bis (p-secbutylbenzenesulfonylcarbamoyl)hexamethylenediamine was heated at 150° C. with stirring and a total of 70 g. of phosgene was passed into the suspension over a period of 45 minutes. The temperature was slowly increased to 177° C. during the addition of phosgene. The resulting mixture was cooled and purged with nitrogen for 30 minutes at the end of which time the o-dichlorobenzene was removed by distillation under reduced pressure (boiling point 57 to 63° C. at 9–11 mm. of mercury) using an 18″ Vigreux column. The residue was then fractionally distilled using the same column. The first fraction (12.1 g.) obtained had a boiling point of 63 to 100° C. at 10 mm. of mercury and was substantially pure o-dichlorobenzene. The second fraction (39.1 g.) had a boiling point of 100 to 136° C. at 10 mm. of mercury and was shown by vapour phase chromatography to contain 90% of hexamethylene diisocyanate (representing ca. 100% yield) and 10% of o-dichlorobenzene. This fraction was then redistilled using the same column to give pure hexamethylene diisocyanate having a boiling point of 126 to 128° C. at 10 mm. of mercury.

The undistilled residue from the first fractional distillation was distilled in vacuo to obtain 89.5 g. (93.5% recovery) of p-secbutylbenzenesulfonyl isocyanate having a boiling point of 109 to 118° C. at 0.4 to 1.5 mm. of mercury.

Example 2—Tetramethylene diisocyanate

A total of 39.4 g. (0.2 mole) of p-toluenesulfonyl isocyanate was added slowly with stirring over a period of 19 minutes to a solution of 8.8 g. (0.1 mole) of tetramethylenediamine in 300 ml. of o-dichlorobenzene. The temperature rose during the addition from an initial value of 22° C. to a maximum of 56° C. The resulting suspension of N,N'-bis(p-toluenesulfonylcarbamoyl)-tetramethylenediamine in o-dichlorobenzene was then heated to 178° C. and a total of 99 g. (1 mole) of phosgene was passed in with stirring over a period of 100 minutes. At the end of this time the mixture was cooled and purged with nitrogen for 30 minutes. The mixture so obtained was distilled under reduced pressure to yield a first fraction of o-dichlorobenzene having a boiling point of 60–77° C. at 0.8 mm. and a second fraction (41.9 g.) having a boiling point of 77 to 104° C. at 0.8–2 mm. of mercury which was shown by vapor phase chromatography to contain 25.3% of tetramethylene diisocyanate (75.6% yield) and 74% of p-toluenesulfonyl isocyanate. This second fraction was then fractionally distilled under reduced pressure to yield tetramethylene diisocyanate having a boiling point of 94 to 98° C. at 10 mm. of mercury.

Example 3—Hexamethylene diisocyanate

A total of 197 g. (1 mole) of p-toluenesulfonyl isocyanate was added slowly with stirring over a period of 28 minutes to a solution of 58 g. (0.5 mole) of hexamethylenediamine in 2 liters of anhydrous benzene. The temperature rose from an initial value of 20° C. to a final value of 51° C. The resulting suspension was cooled to approximately 25° C. and filtered. The solid precipitate was washed with benzene before being dried. There was thus obtained 251 g. of N,N'-bis(p-toluenesulfonylcarbamoyl) hexamethylene diamine in the form of a solid having a melting point of 208 to 212° C.

A suspension of 20.6 g. (0.06 mole) of N,N'-bis(p-toluenesulfonylcarbamoyl)hexamethylene diamine (prepared as described above) in 300 ml. of o-dichlorobenzene was heated at 130° C. to 142° C. with stirring while a total of 66 g. of phosgene was added over a period of 66 minutes. The resulting mixture was purged with nitrogen for 20 minutes at 130 to 145° C. before being fractionally distilled under reduced pressure. After distillation of o-dichlorobenzene at 63 to 68° C. at 13 mm. of mercury a fraction of 27.4 g. having a boiling point of 109 to 122° C. at 2.5–3.5 mm. of mercury was collected. This fraction was shown by vapor phase chromatography to contain 8.9 g. (representing an 89.5% yield) of hexamethylene diisocyanate and 15.9 g. of p-toluenesulfonyl isocyanate. This fraction was submitted to fractional distillation to obtain pure hexamethylene diisocyanate having a boiling point of 126 to 128° C. at 10 mm. of mercury.

Example 4—2-ethoxyethyl isocyanate

A total of 98.5 g. (0.5 mole) of p-toluenesulfonylisocyanate was added slowly with stirring to a solution of 45.5 g. (0.5 mole) of 2-ethoxyethylamine in 700 ml. of anhydrous benzene over a period of 22 minutes. The initial temperature of 25° C. rose to a final temperature of 55° C. The resulting mixture was cooled to approximately 25° C. and filtered. The isolated solid was washed with benzene and dried to give 123 g. of 1-p-toluenesulfonyl-3-(2-ethoxyethyl)urea in the form of a solid having a melting point of 114 to 115° C.

A suspension of 85.8 g. (0.3 mole) of 1-p-toluenesulfonyl-3-(2-ethoxyethyl)urea (prepared as described above) in 430 ml. of o-dichlorobenzene was stirred and heated at 80 to 158° C. while a total of 68 g. (0.68 mole) of phosgene was added over a period of 68 minutes. The resulting mixture was purged with nitrogen for 20 minutes at a temperature of 158 to 168° C. and then was fractionally distilled through an 18″ Vigreux column. After removal of o-dichlorobenzene a fraction (29.5 g.) having a boiling point of 120 to 160° C. was obtained which was then redistilled to give 23.5 g. of 2-ethoxyethyl isocyanate in the form of a liquid having a boiling point of 140 to 142° C. The first fraction from the distillation was shown by vapor phase chromatography to contain a further 2.7 g. of 2-ethoxyethyl isocyanate, which was isolated by fractional distillation representing a total yield of the latter compound of 76%.

Example 5—Trimethylene diisocyanate

A total of 118.2 g. (0.6 mole) of p-toluenesulfonyl isocyanate was added dropwise with stirring over a period of 20 minutes to a solution of 22.2 g. (0.3 mole) of trimethylene diamine in 1200 ml. of chlorobenzene. The initial temperature of 220° C. increased to a final temperature of 52° C. The resulting suspension was heated with stirring at 130° C. while phosgene was added at a rate of 2 g./min. for 1.5 hours and then at 1 g./min. for 80 minutes. The resulting mixture was purged with nitrogen for 30 minutes before being fractionally distilled under reduced pressure. After removal of chlorobenzene there was obtained 14.7 g. of trimethylene diisocyanate having a boiling point of 30 to 85° C. at 14 to 16 mm. of mercury which was redistilled to remove residual amounts of solvent. A second fraction of 92.8 g. having a boiling point of 110 to 135° C. at 1 to 7 mm. of mercury was shown by vapor phase chromatography to contain 89.3 g. of p-toluenesulfonyl isocyanate and 1.67 g. of trimethylene diisocyanate. The total yield of trimethylene diisocyanate was 39.6% theory.

Example 6—3-oxapentamethylene diisocyanate

Using the procedure described in Example 2, but replacing tetramethylene diamine by the known compound 3-oxapentamethylene diamine, there is obtained 3-oxapentamethylene diisocyanate.

Similarly, using the procedure described in Example 2, but replacing tetramethylene diamine by decamethylenediamine, octamethylenediamine, 1,3-octylene diamine, 3,5-dioxaheptamethylenediamine, 5 - oxanonamethylenediamine, 4,7-dioxadecamethylene diamine, 5-methyl-4, 6-dioxanonamethylene diamine, and 4,7,10-trioxatridecamethylenediamine, there are obtained decamethylene diisocyanate, octamethylene diisocyanate, 1,3-octylene diisocyanate, 3,5-dioxaheptamethylene diisocyanate, 5-oxanonamethylene diisocyanate, 4,7,-dioxaheptamethylene diisocyanate, 5-methyl-4,6-dioxanonamethylene diisocyanate, and 4,7,10-trioxatridecamethylene diisocyanate, respectively.

Example 7—2-ethylthioethyl isocyanate

Using the procedure described in Example 4, but replacing 2-ethoxyethylamine by 2-ethylthioethylamine, there is obtained 2-ethylthioethyl isocyanate.

Similarly, using the procedure described in Example 4, but replacing 2-ethoxyethylamine by the known compounds 3-methylthiopropylamine, 3-methoxypropylamine, 3-methoxybutylamine, 2-propoxyethylamine, 2-(2-methoxyethoxy)ethylamine, 3-isopropoxypropylamine, 2-butylthioethylamine, 1-(1-methoxyethyl)butylamine, 2-pentylthioethylamine, 2-(ethoxymethyl)-1,2-dimethylpropylamine, 2-hexylthioethylamine, 1-(3-methoxypropyl pentylamine, 2-heptylthioethylamine, 3-(2-ethylhexyloxy)propylamine, 2-heptylthioethylamine, 3-(2-ethylhexyloxy) propylamine, and dodecylthiomethylamine, there are obtained 3-methylthiopropyl isocyanate, 3-methoxypropyl isocyanate, 3-methoxybutyl isocyanate, 2-propoxyethyl isocyanate, 2-(2-methoxyethoxy)ethyl isocyanate, 3-isopropoxypropyl isocyanate, 2-butylthioethyl isocyanate, 1-(1-methoxyethyl)butyl isocyanate, 2-pentylthioethyl isocyanate, 2-(ethoxymethyl)-1,2-dimethylpropyl isocyanate, 2-hexylthioethyl isocyanate, 1-(3-methoxypropyl)pentyl isocyanate, 2-heptylthioethyl isocyanate, 3-(2-ethylhexyloxy)propyl isocyanate, and dodecylthiomethyl isocyanate, respectively.

Example 8—3-thiapentamethylene diisocyanate

Using the procedure described in Example 2, but replacing tetramethylene diamine by the known compound 3-thiapentamethylene diamine, there is obtained 3-thiapentamethylene disocyanate.

Similarly, using the procedure described in Example 2, but replacing tetramethylene diamine by the following known compounds:

3,7-dithianonamethylenediamine,
4,7-dithiadecamethylenediamine,
4,8-dithiaundecamethylenediamine,
3,6-dithiaoctamethylenediamine and
5-thiaundecamethylenediamine there are obtained:

3,7-dithianonamethylene diisocyanate,
4,7-dithiadecamethylene diisocyanate,
4,8-dithiaundecamethylene diisocyanate,
3,6-dithiaoctamethylene diisocyanate, and
5-thiaundecamethylene diisocyanate, respectively.

Example 9—Hexamethylene diisocyanate

Using the procedure described in Example 3, but replacing p-toluenesulfonyl isocyanate by other sulfonyl isocyanates, for example, methanesulfonyl isocyanate, butanesulfonyl isocyanate, 2-hexylsulfonyl isocyanate, octylsulfonyl isocyanate, 2-bromoethylsulfonyl isocyanate, 4-cyanobutylsulfonyl isocyanate, p-methoxybenzenesulfonyl isocyanate, o-ethoxybenzenesulfonyl isocyanate, p-fluorobenzenesulfonyl isocyanate, m - chlorobenzenesulfonyl isocyanate, p-cyanobenzenesulfonyl isocyanate, m-methylthiobenzenesulfonyl isocyanate, p-nitrobenzenesulfonyl isocyanate, m-xylylsulfonyl isocyanate, 2-naphthylsulfonyl isocyanate, methoxymethylsulfonyl isocyanate, trifluoromethylsulfonyl isocyanate, and the like, there is obtained hexamethylene diisocyanate in yields comparable to those obtained in Example 3.

Example 10—1,3,6-hexane triisocyanate

Using the procedure described in Example 3, but replacing hexamethylene diisocyanate by 1,3,6-hexane triamine, there is obtained 1,3,6-hexane triisocyanate.

We claim:

1. A process for the conversion of an alkylene diamine of from 1 to 12 carbon atoms, inclusive, to the corresponding alkylene diisocyanate which comprises reacting the alkylene diamine with at least 2 equivalent proportions of a hydrocarbylsulfonyl isocyanate wherein hydrocarbyl is from 1 to 18 carbon atoms, inclusive, in the presence of an inert organic solvent at a temperature of about 25° C. to about 70° C. to form the corresponding N,N'-bis(hydrocarbylsulfonylcarbamoyl)alkylene diamine and reacting the latter compound with phosgene at a temperature of about 80° C. to about 180° C. to produce the desired alkylene diisocyanate.

2. A process for the conversion of an alkoxyalkylamine wherein the total carbon atom content is from 2 to 18, inclusive, to the corresponding alkoxyalkyl isocyanate which comprises reacting said alkoxyalkylamine with a hydrocarbylsulfonyl isocyanate wherein hydrocarbyl is from 1 to 18 carbon atoms, inclusive, in the presence of an inert organic solvent at a temperature of about 25° C. to about 70° C. to form the corresponding 1-hydrocarbylsulfonyl-3-alkoxyalkylurea, and reacting the latter compound with phosgene at a temperature of about 80° C. to about 180° C. to produce the desired alkoxyalkyl isocyanate.

3. A process for the conversion of an alkylthioalkylamine wherein the total carbon atom content is from 2 to 18, inclusive, to the corresponding alkylthioalkyl isocyanate which comprises reacting said alkylthioalkylamine with a hydrocarbylsulfonyl isocyanate wherein hydrocarbyl is from 1 to 18 carbon atoms, inclusive, in the presence of an inert organic solvent at a temperature of about 25° C. to about 70° C. to form the corresponding 1-hydrocarbylsulfonyl-3-alkylthioalkylurea, and reacting the latter compound with phosgene at a temperature of about 80° C. to about 180° C. to produce the desired alkylthioalkyl isocyanate.

4. A process for the conversion of an aliphatic diamine having the formula:

$$NH_2\text{---}(C_nH_{2n}\text{---}B)_x C_mH_{2m}\text{---}NH_2$$

wherein $C_nH_{2n}$ and $C_mH_{2m}$ each represent alkylene containing from 1 to 10 carbon atoms, inclusive, B is selected from the group consisting of oxygen and sulfur and $x$ is an integer from 1 to 3, to the corresponding diisocyanate, which comprises reacting said aliphatic diamine at a temperature of about 25° C. to about 70° C. with at least two equivalents of a hydrocarbylsulfonyl isocyanate wherein hydrocarbyl is from 1 to 18 carbon atoms, inclusive, to form the corresponding N,N'-bis(hydrocarbylsulfonylcarbamoyl)diamine, and reacting the latter compound with prosgene at a temperature of about 80° C. to about 180° C. to produce the diisocyanate corresponding to the aliphatic diamine starting compound.

5. In a process for the preparation of an alkylene diisocyanate of from 1 to 12 carbon atoms, inclusive, the step which comprises reacting the N,N'-bis(hydrocarbylsulfonylcarbamoyl) derivatives of the corresponding alkylene diamine wherein hydrocarbyl is from 1 to 18 carbon atoms, inclusive, with phosgene at a temperature within the range of about 80° C. to about 180° C.

6. In a process for the preparation of an alkoxyalkyl isocyanate wherein the total carbon atom content is from 2 to 18, inclusive, the step which comprises reacting the hydrocarbylsulfonylcarbamoyl derivative of the corresponding alkoxyalkylamine wherein hydrocarbyl is from 1 to 18 carbon atoms, inclusive, with phosgene at a temperature within the range of about 80° C. to about 180° C.

7. In a process for the preparation of an alkylthioalkyl isocyanate wherein the total carbon atom content is from 2 to 18, inclusive, the step which comprises reacting the hydrocarbylsulfonylcarbamoyl derivative of the corresponding alkylthioalkylamine wherein hydrocarbyl is from 1 to 18 carbon atoms, inclusive, with phosgene at a temperature within the range of about 80° C. to about 180° C.

8. In a process for the preparation of an aliphatic diisocyanate having the formula:

$$OCN(C_nH_{2n}-B)_xC_mH_{2m}-NCO$$

wherein $C_nH_{2n}$ and $C_mH_{2m}$ each represent alkylene containing from 1 to 10 carbon atoms, inclusive, B is selected from the group consisting of oxygen and sulfur and $x$ is an integer from 1 to 3, the step which comprises reacting the N,N'-(hydrocarbylsulfonylcarbamoyl) derivative of the corresponding aliphatic diamine wherein hydrocarbyl is from 1 to 18 carbon atoms, inclusive, with phosgene at a temperature within the range of about 80° C. to about 180° C.

9. A process for the preparation of hexamethylenediisocyanate which comprises reacting hexamethylenediamine with at least two equivalents of a hydrocarbyl sulfonyl isocyanate in the presence of an inert organic solvent at a temperature of about 25° C. to about 70° C. to form the corresponding N,N'-bis(hydrocarbylsulfonylcarbamoyl)alkylenediamine wherein hydrocarbyl is from 1 to 18 carbon atoms, inclusive, and reacting the latter compound with phosgene at a temperature within the range of about 80° C. to about 180° C. to form hexamethylene diisocyanate.

10. A process for the preparation of 2-ethoxyethyl isocyanate which comprises reacting 2-ethoxyethylamine with at least one equivalent of a hydrocarbylsulfonyl isocyanate wherein hydrocarbyl is from 1 to 18 carbon atoms, inclusive, in the presence of an inert organic solvent at a temperature of about 25° C. to about 70° C. to form the corresponding N-hydrocarbylsulfonylcarbamoyl-2-ethoxyethylamine and reacting the latter compound with phosgene at a temperature within the range of about 80° C. to about 180° C. to form the desired 2-ethoxyethyl isocyanate.

References Cited

UNITED STATES PATENTS

| 2,962,530 | 11/1960 | Habicht | 260—553 |
| 3,157,700 | 11/1964 | Schmidt et al. | 260—553 |
| 3,330,849 | 7/1967 | Ulrich | 260—453 |

FOREIGN PATENTS

| 29,929 | 5/1884 | Germany. |
| 898,406 | 6/1962 | Great Britain. |

OTHER REFERENCES

Saunders et al.; Chem. Rev., vol. 93 pp. 203–205 (1940).

FLOYD D. HIGEL, *Primary Examiner.*